(12) United States Patent
Suto et al.

(10) Patent No.: US 12,454,632 B2
(45) Date of Patent: Oct. 28, 2025

(54) CURABLE SILICONE COMPOSITION, RELEASE COATING AGENT COMPRISING SAID COMPOSITION, RELEASE FILM OBTAINED USING SAID RELEASE COATING AGENT, AND LAYERED PRODUCT INCLUDING SAID RELEASE FILM

(71) Applicant: Dow Toray Co., Ltd., Tokyo (JP)

(72) Inventors: Michitaka Suto, Chiba (JP); Satoshi Onodera, Chiba (JP); Tadashi Okawa, Chiba (JP); Hidefumi Tanaka, Chiba (JP); Haruhiko Furukawa, Chiba (JP)

(73) Assignee: DOW TORAY CO., LTD., Tokyo (JP)

( * ) Notice: Subject to any disclaimer, the term of this patent is extended or adjusted under 35 U.S.C. 154(b) by 1158 days.

(21) Appl. No.: 17/418,387

(22) PCT Filed: Dec. 27, 2019

(86) PCT No.: PCT/JP2019/051399
§ 371 (c)(1),
(2) Date: Jun. 25, 2021

(87) PCT Pub. No.: WO2020/138413
PCT Pub. Date: Jul. 2, 2020

(65) Prior Publication Data
US 2022/0056322 A1 Feb. 24, 2022

(30) Foreign Application Priority Data

Dec. 27, 2018 (JP) ................................. 2018-245681

(51) Int. Cl.
C09J 7/40 (2018.01)
B32B 7/06 (2019.01)
B32B 7/12 (2006.01)
C09J 7/38 (2018.01)

(52) U.S. Cl.
CPC ............. C09J 7/401 (2018.01); B32B 7/06 (2013.01); B32B 7/12 (2013.01); C09J 7/38 (2018.01); B32B 2405/00 (2013.01); C09J 2483/00 (2013.01); C09J 2483/005 (2013.01)

(58) Field of Classification Search
CPC ............. C09J 7/401; C09J 7/38; B32B 7/12
See application file for complete search history.

(56) References Cited

U.S. PATENT DOCUMENTS

| | | |
|---|---|---|
| 4,529,752 A | 7/1985 | Bluestein |
| 4,968,766 A | 11/1990 | Kendziorski |
| 4,985,526 A | 1/1991 | Kishita et al. |
| 5,073,422 A | 12/1991 | Konno et al. |
| 5,082,706 A | 1/1992 | Tangney |
| 5,097,054 A | 3/1992 | Yamamoto et al. |
| 5,166,294 A | 11/1992 | Kishita et al. |
| 5,578,381 A | 11/1996 | Hamada et al. |
| 12,037,525 B2 * | 7/2024 | Suto ............................ C09J 7/38 |
| 2004/0186225 A1 | 9/2004 | Yamaguchi |
| 2012/0219794 A1 | 8/2012 | Seth et al. |
| 2016/0297999 A1 | 10/2016 | Carvajal et al. |
| 2016/0329562 A1 | 11/2016 | Akira et al. |
| 2017/0190939 A1 * | 7/2017 | Hori ............................ B32B 5/02 |
| 2018/0086915 A1 | 3/2018 | Tsuchida |
| 2020/0071527 A1 | 3/2020 | Fukui et al. |

FOREIGN PATENT DOCUMENTS

| | | |
|---|---|---|
| JP | 5980464 A | 5/1984 |
| JP | S63255288 A | 10/1988 |
| JP | S6474268 A | 3/1989 |
| JP | H02189383 A | 7/1990 |
| JP | H02245031 A | 9/1990 |
| JP | H03197484 A | 1/1994 |
| JP | H06145527 A | 5/1994 |
| JP | H06321968 A | 11/1994 |
| JP | H0873809 A | 3/1996 |
| JP | H08325995 A | 12/1996 |

(Continued)

OTHER PUBLICATIONS

International Search Report for PCT/JP2019/051399 dated Mar. 3, 2020, 2 pages.
Machine assisted English translation of JP2017165893A obtained from https://patents.google.com/patent on Oct. 5, 2021, 9 pages.
Machine assisted English translation of JP2016182772A obtained from https://patents.google.com/patent on Oct. 5, 2021, 16 pages.
Machine assisted English translation of JP2004300414A obtained from https://patents.google.com/patent on Oct. 5, 2021, 8 pages.
Machine assisted English translation of JP2010135617A obtained from https://patents.google.com/patent on Oct. 5, 2021, 10 pages.
Machine assisted English translation of JPH08325995A obtained from https://patents.google.com/patent on Oct. 5, 2021, 8 pages.
Machine assisted English translation of JP2007211186A obtained from https://patents.google.com/patent on Oct. 5, 2021, 10 pages.

(Continued)

*Primary Examiner* — Gregory Listvoyb
(74) *Attorney, Agent, or Firm* — Warner Norcross + Judd LLP (57) ABSTRACT

Provided is a curable silicone composition for a release agent which can release a release film from a silicone adhesive with low release force without reducing the adhesive strength of the silicone adhesive to other substrates upon releasing the release film. A release film or laminate having the small release force of the silicone adhesive is also provided. The curable silicone composition comprises: (A) a mixture of two or more fluoroalkyl group-containing organopolysiloxanes having a fluoroalkyl group and at least two alkenyl groups per molecule, wherein the contents of the fluoroalkyl groups differ from each other, and the two or more fluoroalkyl group-containing organopolysiloxanes are a combination of those which are not completely compatibilized at 25° C. when mixed in the absence of a solvent; (B) an organopolysiloxane having at least three silicon-bonded hydrogen atoms per molecule; (C) an effective amount of a hydrosilylation reaction catalyst; and (D) an organic solvent.

8 Claims, 2 Drawing Sheets

(56) References Cited

FOREIGN PATENT DOCUMENTS

| | | |
|---|---|---|
| JP | H08325998 A | 12/1996 |
| JP | H11246772 A | 9/1999 |
| JP | 2004300414 A | 10/2004 |
| JP | 2005060554 A | 3/2005 |
| JP | 2007211186 A | 8/2007 |
| JP | 2007326312 A | 12/2007 |
| JP | 2010135617 A | 6/2010 |
| JP | 2013510921 A | 3/2013 |
| JP | 2016182772 A | 10/2016 |
| JP | 2016183291 A | 10/2016 |
| JP | 2017505361 A | 2/2017 |
| JP | 2017165893 A | 9/2017 |
| WO | 2016098334 A1 | 6/2016 |
| WO | 2016152992 A1 | 9/2016 |
| WO | 2018211981 A | 11/2018 |

OTHER PUBLICATIONS

Machine assisted English translation of JPH06145527A obtained from https://patents.google.com/patent on Oct. 5, 2021, 8 pages.
Machine assisted English translation of JP2005060554A obtained from https://patents.google.com/patent on Oct. 5, 2021, 9 pages.
Machine assisted English translation of JP2016183291A obtained from https://patents.google.com/patent on Oct. 5, 2021, 14 pages.
Machine assisted English translation of JPH08325998A obtained from https://patents.google.com/patent on Oct. 6, 2021, 10 pages.
Machine assisted English translation of JPS63255288A obtained from https://worldwide.espacenet.com on Oct. 6, 2021, 4 pages.
Machine assisted English translation of JPH06321968A obtained from https://patents.google.com/patent on Oct. 6, 2021, 6 pages.
Machine assisted English translation of JPH11246772A obtained from https://patents.google.com/patent on Oct. 6, 2021, 8 pages.
Machine assisted English translation of JP2007326312 obtained from https://patents.google.com/patent on Feb. 17, 2023, 22 pages.

* cited by examiner

CURABLE SILICONE COMPOSITION, RELEASE COATING AGENT COMPRISING SAID COMPOSITION, RELEASE FILM OBTAINED USING SAID RELEASE COATING AGENT, AND LAYERED PRODUCT INCLUDING SAID RELEASE FILM

CROSS-REFERENCE TO RELATED APPLICATIONS

This application is the U.S. National Stage of International Application No. PCT/JP2019/051399 filed on 27 Dec. 2019, which claims priority to and all advantages of Japanese Application No. 2018-245681 filed on 27 Dec. 2018, the content of which is incorporated herein by reference.

TECHNICAL FIELD

The present invention relates to a curable silicone composition, a release coating agent consisting of the composition, specifically, a release coating agent for a silicone adhesive (pressure sensitive adhesive), a release film using the release coating agent, specifically, a release film for a silicone adhesive, and a laminate including the release film, specifically, a laminate including the release film and the silicone adhesive.

BACKGROUND ART

Silicone adhesives (pressure-sensitive adhesives) have been widely used as adhesives for industrial protective tapes, masking tapes, and various medical functional tapes due to their excellent heat resistance, cold resistance, weather resistance, chemical resistance, electrical insulation, etc. Moreover, in recent years, silicone adhesives have been used for so-called assembly applications represented by optical components for liquid crystal displays (display devices, functional films, lenses, etc.). Since silicone pressure-sensitive adhesives strongly adhere to surfaces coated with silicone rubber or silicone based materials, normal silicone based release agents used in acrylic and organic rubber based adhesives cannot be used, so various curable silicone release agent compositions have been proposed to form a release film enabling the release of such adhesives. The composition is coated on a flexible substrate such as a plastic film as a release coating agent to form a release film, which is used as a laminate of a sheet or rolled tape pasted together with a silicone adhesive.

When the release film is released from such a laminate and used, a lower stable release force is required in order to increase the working efficiency and prevent surface roughness of the silicone adhesive upon release.

In contrast, the adhesive force of the silicone adhesive released from the release film preferably has low adverse effects such as a reduction in the adhesive force caused by long term adhesion with the release film.

For example, as a release agent composition for a silicone adhesive, Patent Document 1 proposes a curable coating composition including: an organopolysiloxane having at least 300 silicon atoms, from 0.5 to 2 mole % of a vinyl group-containing siloxane unit, and 30 mole % of a fluoroalkyl group-containing siloxane unit; an organohydrogenpolysiloxane having an average of at least two silicon-bonded hydrogen atoms in each molecule and being compatible with the organopolysiloxane; a hydrosilylation reaction catalyst; and a hydrosilylation reaction inhibitor.

Moreover, Patent Document 2 proposes a release agent composition for a silicone adhesive including two fluoroalkyl-modified polydimethylsiloxanes having different amounts of alkenyl groups for the purpose of light release, as well as a release sheet formed by applying the release agent composition to a substrate.

For example, Patent Document 3 proposes a release agent composition for a silicone pressure-sensitive adhesive including: an organopolysiloxane having an alkenyl group-containing organic group and a fluoroalkyl group; an organohydrogenpolysiloxane having at least three silicon-bonded hydrogen atoms per molecule; a hydrosilylation reaction catalyst; an organic solvent; and an organopolysiloxane having an alkenyl group but no fluoroalkyl group, in addition to also proposing a release film formed by applying the release agent composition to a plastic film.

PRIOR ART DOCUMENTS

Patent Documents

Patent Document 1: Japanese Unexamined Patent Application Publication No. H2-245031
Patent Document 2: Japanese Unexamined Patent Application Publication No. 2005-60554
Patent Document 3: Japanese Unexamined Patent Application Publication No. 2016-183291

SUMMARY OF THE INVENTION

Problems to be Solved by the Invention

However, there is a demand for further improvement in order to solve the problem in which even when a release film, as well as a laminate, is formed using a conventionally known composition as a release coating agent, the release film can be released from the silicone adhesive with a lower release force, the release force can be adjusted as necessary, and further, the adhesive force of the silicone adhesive to other substrates upon releasing the release film is not reduced as much as possible.

An object of the present invention is to provide: a release film which can be released from a silicone adhesive (also referred to as a silicone pressure sensitive adhesive) with low release force, without significantly reducing the adhesive force of the silicone adhesive upon releasing the release film after pasting together the release film, compared with the case in which the release film has not been pasted together; a release agent therefor; a curable silicone composition which can be used as a release agent; and a laminate which includes a substrate, a silicone adhesive layer, and a release agent layer.

Means for Solving the Problems

The present inventors found that the abovementioned problems can be solved using, as a release agent, a curable silicone composition including a combination of two or more organopolysiloxanes (as an organopolysiloxane having a fluoroalkyl group and at least two alkenyl groups per molecule) which are not completely compatible or are completely incompatible via visual observation after being left to stand for 24 hours following stirring at 25° C. when mixed in the absence of a solvent, leading to the completion of the present invention.

The curable silicone composition according to the present invention contains the following (A) to (D):

(A) a mixture of two or more fluoroalkyl group-containing organopolysiloxanes having a fluoroalkyl group and at least two alkenyl groups per molecule, wherein the contents of the fluoroalkyl groups differ from each other, and wherein the two or more fluoroalkyl group-containing organopolysiloxanes are a combination of those which are not completely compatibilized at 25° C. when mixed in the absence of a solvent;

(B) an organopolysiloxane having at least three silicon-bonded hydrogen atoms per molecule;

(C) an effective amount of a hydrosilylation reaction catalyst; and (D) an organic solvent capable of compatibilizing the entire composition by uniformly compatibilizing the mixture of two or more fluoroalkyl group-containing organopolysiloxanes serving as component (A).

In the abovementioned curable silicone composition, component (A) is preferably a mixture of:

(A1) one or more linear or branched organopolysiloxanes including fluoroalkyl group-containing organodisiloxane units and having a fluorine atom content of 40 mass % or more; and (A2) one or more linear or branched organopolysiloxanes including fluoroalkyl group-containing organodisiloxane units and having a fluorine atom content of less than 40 mass %.

The difference between the fluorine atom content (mass %) of component (A1) and the fluorine atom content (mass %) of component (A2) is further preferably 3 mass % or more.

The fluorine atom content of components (A1) and (A2) satisfy any of the abovementioned conditions, and in one aspect according to the present invention, component (A) can be a mixture of:

(A1) one or more linear or branched organopolysiloxanes including fluoroalkyl group-containing organodisiloxane units, wherein the fluoroalkyl group is a 3,3,4,4,5,5,6,6,6-nonafluorohexyl group, and wherein the units are 39 mole % or more of the total organodisiloxane units; and (A2) one or more linear or branched organopolysiloxanes comprising fluoroalkyl group-containing organodisiloxane units, wherein the fluoroalkyl group is a 3,3,4,4,5,5,6,6,6-nonafluorohexyl group, and wherein the units are 36 mole % or less of the total organosiloxane units.

In the curable silicone composition according to the present invention, the mass ratio of component (A1) to component (A2) contained in the composition is preferably 1/99 to 99/1 (component (A1):component (A2)).

When components (A1) and (A2) are used in combination, a release force is obtained that is lower than the release force for the silicone adhesive, which is estimated by arithmetic means, based on the results of each independently using component (A1) or (A2) instead of component (A).

As the organic solvent for component (D) of the curable silicone composition according to the present invention, a solvent mixture is preferably used which consists of one solvent or two or more solvents selected from the group consisting of diethyl ether, dipropyl ether, diisopropyl ether, dibutyl ether, diisobutyl ether, di-sec-butyl ether, di-tert-butyl ether, methyl-tert-butyl ether, ethyl-tert-butyl ether, and pentane.

The curable silicone composition according to the present invention may optionally contain a hydrosilylation reaction inhibitor as component (E).

The present invention further provides a release coating agent, wherein the release coating agent according to the present invention consists of the abovementioned curable silicone composition. The release coating agent according to the present invention can further include an additive.

In one aspect of the present invention, the release coating agent is a release coating agent for a silicone adhesive.

The present invention further provides a release film including: a film-like substrate; and a release layer consisting of a cured product obtained by curing the release coating agent.

In the release film, the substrate is preferably a plastic film.

In the present release film, the silicone adhesive layer preferably has a thickness of 2 μm or less.

The release film is preferably a release film for silicone adhesives.

The present invention further provides a laminate using the abovementioned release coating agent. In one aspect of the present invention, the laminate is a laminate including a structure in which a silicone adhesive layer is disposed so as to face at least one release layer, wherein the release layer is a release layer consisting of a cured product formed by curing the release coating agent. Moreover, the release film according to the present invention includes a film-like substrate and a release layer. Moreover, the laminate includes a laminate structure configured so as to include a silicone adhesive disposed on the release layer, and includes: a laminate which includes an adhesive formed by a curing reaction on the release layer; and a laminate formed by pasting together a release layer to a previously formed adhesive.

Effects of the Invention

Upon using the curable silicone composition according to the present invention as a release coating agent, even if the thickness of the release layer is thin, a release film can be formed in which the silicone adhesive adhered on the release layer can be released from the release layer with low release force. Moreover, the release film and laminate according to the present invention allows a silicone pressure-sensitive adhesive disposed on the release layer to be released from the release layer with low release force.

MODE FOR CARRYING OUT THE INVENTION

The curable silicone composition of the present invention is described below in detail.

[Curable Silicone Composition]

As mentioned above, the curable silicone composition according to the present invention contains the following (A) to (D):

(A) a mixture of two or more fluoroalkyl group-containing organopolysiloxanes having a fluoroalkyl group and at least two alkenyl groups per molecule, wherein the contents of the fluoroalkyl groups differ from each other, and wherein the two or more fluoroalkyl group-containing organopolysiloxanes are a combination of those which are not completely compatibilized at 25° C. when mixed in the absence of a solvent;

(B) an organopolysiloxane having at least three silicon-bonded hydrogen atoms per molecule;

(C) an effective amount of a hydrosilylation reaction catalyst; and

(D) an organic solvent capable of compatibilizing the entire composition by uniformly compatibilizing the mixture of two or more fluoroalkyl group-containing organopolysiloxanes serving as component (A).

Optional components which may be further added to these essential components (A), (B), (C), and (D) will be described along with the curable silicone composition.

(Component (A))

Component (A) is a mixture of two or more fluoroalkyl group-containing organopolysiloxanes having a fluoroalkyl group and at least two alkenyl groups per molecule, wherein the contents of the fluoroalkyl groups differ from each other. Further, the two or more fluoroalkyl group-containing organopolysiloxanes must be a combination of those which are not completely compatibilized at 25° C. when mixed in the absence of a solvent. The phrase "not completely compatible at 25° C. when mixed in the absence of a solvent" means that when the mixture of two or more fluoroalkyl group-containing organopolysiloxanes is placed in a transparent glass vial with a lid and sufficiently stirred at 25° C., it is immediately thereafter visually observed after 24 hours to be cloudy or separated into two phases and not exhibit a uniform and transparent liquid state. Note that this means that when the fluoroalkyl group-containing organopolysiloxanes is other than a gum-like or paste-like liquid at 25° C., the mixture is heated to a temperature in liquid form, sufficiently stirred and then cooled to 25° C., and immediately thereafter visually observed after 24 hours to be cloudy or to be separated into two phases and not exhibit a uniform and transparent liquid state.

Component (A) is preferably an organopolysiloxane represented by the following average composition formula (I):

$$(R^1_3SiO_{1/2})_a(R^1_2SiO_{2/2})_b(R^1SiO_{3/2})_c(SiO_{4/2})_d \quad (I)$$

(wherein, the $R^1$ moieties are the same or different alkyl groups having 1 to 12 carbon atoms, alkenyl groups having 2 to 12 carbon atoms, aryl groups having 6 to 12 carbon atoms, aralkyl groups having 7 to 12 carbon atoms, or fluoroalkyl groups having 1 to 12 carbon atoms; at least two $R^1$ moieties per molecule are alkenyl groups; at least one $R^1$ per molecule is a fluoroalkyl group having 1 to 12 carbon atoms; a is a positive number; b is a positive number; c is 0 or a positive number; and d is 0 or a positive number).

Note that in formula (I), $R^1$ may be a small amount of hydroxyl groups or alkoxy groups as long as it does not impair the object of the present invention.

Exemplary alkyl groups which may be represented by $R^1$ in formula (I) having 1 to 12 carbon atoms include methyl groups, ethyl groups, propyl groups, butyl groups, pentyl groups, hexyl groups, heptyl groups, octyl groups, nonyl groups, decyl groups, undecyl groups, and dodecyl groups, with methyl groups preferable.

Exemplary alkenyl groups which may be represented by $R^1$ in formula (I) having 2 to 12 carbon atoms include vinyl groups, allyl groups, butenyl groups, pentenyl groups, hexenyl groups, heptenyl groups, octenyl groups, nonenyl groups, decenyl groups, undecenyl groups, and dodecenyl groups, wherein alkenyl groups are preferably independently vinyl groups or hexenyl groups, with vinyl groups particularly preferable. Note that in formula (I), at least two $R^1$ groups are alkenyl groups, wherein the content of the alkenyl groups in terms of vinyl groups is not particularly limited as long as the composition can be cured using the same. However, the content is preferably 2.0 mass % or less, more preferably 1.0 mass % or less, and further preferably 0.5 mass % or less. This is because, if the content of alkenyl groups is greater than necessary, when the release layer for a silicone adhesive is formed using the curable silicone composition according to the present invention as a release coating agent, the release force of the release layer from the silicone adhesive layer may be high. Note that the content of alkenyl groups in terms of vinyl groups refers to the content calculated by replacing the alkenyl groups other than vinyl groups with the mass of an equimolar amount of vinyl groups.

Moreover, exemplary aryl groups in component (A) which may be represented by $R^1$ in formula (I) having 6 to 12 carbon atoms include phenyl groups, tolyl groups, and xylyl groups, with phenyl groups preferable.

Exemplary aralkyl groups which may be represented by $R^1$ in formula (I) having 7 to 12 carbon atoms include benzyl groups and phenethyl groups.

In formula (I), exemplary fluoroalkyl groups which may be represented by $R^1$ having 1 to 12 carbon atoms include a 3,3,3-trifluoropropyl group, a 3,3,4,4,4-pentafluorobutyl group, a 3,3,4,4,5,5,5-heptafluoropentyl group, a 3,3,4,4,5,5,6,6,6-nonafluorohexyl group, a 3,3,4,4,5,5,6,6,7,7,7-undecafluoroheptyl group, a 3,3,4,4,5,5,6,6,7,7,8,8,8-tridecafluorooctyl group, or a 3,3,4,4,5,5,6,6,7,7,8,8,9,9,9-pentadecafluorononyl group, with a 3,3,4,4,5,5,6,6,6-nonafluorohexyl group preferable.

For a to d in the abovementioned formula (I), a is an integer of 2 or more, preferably an integer of 2 to 6, b is 1 or more, preferably an integer of 1 to 5,000, more preferably an integer of 30 to 4,000, c is 0 or a positive number, and d is 0 or a positive number. Regarding component (A), if the degree of siloxane polymerization is less than the lower limit of the abovementioned range, when a curable silicone composition obtained using the component is used as a release coating agent, it may be difficult to form the release layer; in contrast, if the degree of siloxane polymerization exceeds the upper limit of the abovementioned range, the coating properties (particularly thin film applicability) of the obtained curable silicone composition may decrease.

The two or more fluoroalkyl group-containing organopolysiloxanes configuring component (A) are preferably a mixture of two or more organopolysiloxanes represented by the abovementioned average composition formula (I), while component (A) is further particularly preferably a mixture of the following components (A1) and (A2).

(A1) one or more linear or branched organopolysiloxanes including fluoroalkyl group-containing organodisiloxane units and having a fluorine atom content of 40 mass % or more, preferably 41 mass % or more, and further preferably 42 mass % or more; and (A2) one or more linear or branched organopolysiloxanes including fluoroalkyl group-containing organodisiloxane units and having a fluorine atom content of less than 40 mass %, preferably 39% mass or less, and further preferably 38 mass % or less.

That is, in the abovementioned formula (A1), component (A1) is a linear or branched organopolysiloxane, wherein at least one, preferably one of two $R^1$ of the units represented by "$R^1_2SiO_{2/2}$" is a fluoroalkyl group having a carbon number of 1 to 12, particularly preferably a 3,3,4,4,5,5,6,6,6-nonafluorohexyl group, and wherein the proportion of the mass of the fluorine atoms in the total mass of the compound represented by formula (I) is 40 mass % or more, preferably 41 mass % or more, and further preferably 42 mass % or more.

Moreover, in the abovementioned formula (A2), component (A1) is a linear or branched organopolysiloxane, wherein at least one, preferably one of two $R^1$ of the units represented by "$R^1{}_2SiO_{2/2}$" is a fluoroalkyl group having a carbon number of 1 to 12, particularly preferably a 3,3,4,4,5,5,6,6,6-nonafluorohexyl group, and wherein the proportion of the mass of the fluorine atoms in the total mass of the compound represented by formula (I) is less than 40 mass %, preferably 39 mass % or less, and further preferably 38 mass % or less.

Accordingly, the fluorine atom content of each of components (A1) and (A2) is different. The difference between the fluorine atom content of component (A1) and the fluorine atom content of component (A2) is preferably more than 3% by mass, preferably 4% by mass or more. This is because, if the difference between the fluorine atom contents of each of components (A1) and (A2) is the abovementioned value, components (A1) and (A2) tend to be incompatible.

Further, in one aspect of the present invention, when the abovementioned fluorine atom content conditions of components (A1) and (A2) are satisfied, component (A1) includes one or more linear or branched organopolysiloxanes including fluoroalkyl group-containing organodisiloxane units, wherein the fluoroalkyl group is a 3,3,4,4,5,5,6,6,6-nonafluorohexyl group, and wherein the units are 39 mole % or more of the total organosiloxane units; and component (A2) includes fluoroalkyl group-containing organodisiloxane units, wherein component (A2) includes fluoroalkyl group-containing organopolysiloxane units, wherein the fluoroalkyl group is a 3,3,4,4,5,5,6,6,6-nonafluorohexyl group, and wherein the units are 36 mole % or less of the total organosiloxane units.

While not limited thereto, specific examples of component (A1) and component (A2) include the following fluoroalkyl group-containing organopolysiloxanes. In the following formulas, Me, Vi, Hex, Fa1, Fa2, and Fa3 are respectively a methyl group, a vinyl group, an n-hexenyl group, a 3,3,4,4,5,5,6,6,6-nonafluorohexyl group, a 3,3,4,4,5,5,6,6,7,7,8,8,8-tridecafluorooctyl group, and a 3,3,3-trifluoropropyl group.

an organopolysiloxane represented by the average composition formula:

an organopolysiloxane represented by the average composition formula:

an organopolysiloxane represented by the average composition formula:

An organopolysiloxane represented by the average composition formula:

an organopolysiloxane represented by the average composition formula:

an organopolysiloxane represented by the average composition formula:

an organopolysiloxane represented by the average composition formula:

an organopolysiloxane represented by the average composition formula:

an organopolysiloxane represented by the average composition formula:

an organopolysiloxane represented by the average composition formula:

an organopolysiloxane represented by the average composition formula:

In the curable silicone composition according to the present invention, the mass ratio of component (A1) to component (A2) contained in the composition is preferably 1:99 to 99:1 (component (A1):component (A2)), further preferably 10:90 to 90:10 (component (A1):component (A2)), more preferably 20:80 to 80:20 (component (A1):component (A2)), and most preferably 30:70 to 70:30 (component (A1):component (A2)). When components (A1) and (A2) are used in combination, a release force is obtained that is lower than the release force for the silicone adhesive, which is estimated by arithmetic means, based on the results of each independently using component (A1) or (A2) instead of component (A).

(Component (B))

Component (B) is an organopolysiloxane having at least three silicon-bonded hydrogen atoms (Si—H) per molecule and is a component for curing the composition according to an embodiment of the present invention by carrying out an addition reaction using a hydrosilylation reaction with component (A).

Examples of groups bonded to silicon atoms in component (B) other than hydrogen atoms include alkyl groups having 1 to 12 carbon atoms, aryl groups having 6 to 12 carbon atoms, aralkyl groups having 7 to 12 carbon atoms, fluoroalkyl groups having 1 to 12 carbon atoms, and fluoro(poly)ether-containing organic groups having 2 to 10 carbon atoms. Note that a small amount of hydroxyl groups or alkoxy groups may be bonded to the silicon atoms in component (B) within a range that does not impair the object of the present invention.

The molecular structure of component (B) is not particularly limited. Examples thereof include a straight-chain structure, a branched-chain structure, a partially branched straight-chain structure, a resinous structure, and a cyclic structure, with a straight-chain structure or a partially branched straight-chain structure being preferable.

Such exemplary component (B) is an organopolysiloxane represented by the following average composition formula:

$$(R^3{}_3SiO_{1/2})_{aa}(R^3{}_2SiO_{2/2})_{ab}(R^3SiO_{3/2})_{ac}(SiO_{4/2})_{ad} \qquad (II).$$

In formula (II), the $R^3$ moieties are the same or different and are independently hydrogen atoms, alkyl groups having from 1 to 12 carbon atoms, aryl groups having 6 to 12 carbon atoms, aralkyl groups having from 7 to 12 carbon atoms, fluoroalkyl groups having 1 to 12 carbon atoms, or fluoro (poly)ether-containing organic groups. Moreover, aa is a positive number, ab is a positive number, ac is 0 or a positive number, and ad is 0 or a positive number. However, when aa is 2, the total of aa to ad is preferably within a range of from 5 to 200 and within a given range with a lower limit of 10 or 15 and an upper limit of 150, 120, 100, 80, 70, 60, 50, or 40. This is because, when aa is 2 and the total of aa to ad is less than the lower limit of the range described above, crosslinking of the present composition progresses sufficiently, while when the total exceeds the upper limit of the range described above, the handleability of the present composition is favorable.

Exemplary alkyl groups which may be represented by $R^3$ include methyl groups, ethyl groups, propyl groups, butyl groups, pentyl groups, hexyl groups, heptyl groups, octyl groups, nonyl groups, decyl groups, undecyl groups, and dodecyl groups, with methyl groups preferable.

Moreover, exemplary aryl groups which may be represented by $R^3$ include phenyl groups, tolyl groups, and xylyl groups, with phenyl groups preferable.

Moreover, exemplary aralkyl groups which may be represented by $R^3$ include benzyl groups and phenethyl groups.

Further, exemplary fluoroalkyl groups which may be represented by $R^3$ include 3,3,3-trifluoropropyl groups, 3,3,4,4,4-pentafluorobutyl groups, 3,3,4,4,5,5,5-heptafluoropentyl groups, 3,3,4,4,5,5,6,6,6-nonafluorohexyl groups, 3,3,4,4,5,5,6,6,7,7,7-undecafluoroheptyl groups, 3,3,4,4,5,5,6,6,7,7,8,8,8-tridecafluorooctyl groups, and 3,3,4,4,5,5,6,6,7,7,8,8,9,9,9-pentadecafluorononyl groups, wherein groups selected from 3,3,4,4,5,5,5-heptafluoropentyl groups, 3,3,4,4,5,5,6,6,6-nonafluorohexyl groups, 3,3,4,4,5,5,6,6,7,7,7-undecafluoroheptyl groups, and 3,3,4,4,5,5,6,6,7,7,8,8,8-tridecafluorooctyl groups are preferable, and wherein 3,3,4,4,5,5,6,6,6-nona-fluorohexyl groups are particularly preferable.

Moreover, exemplary fluoro(poly)ether-containing organic groups which may be represented by $R^3$ include groups represented by the following formula (1).

$$F(CF_2O)_{a1}(CF_2CF_2O)_{a2}(CF_2CH_2O)_{a3}[CF(CF_3)CF_2O]_{a4}[CF(CF_3)CH_2O]_{a5}(CF_2CF_2CF_2O)_{a6}(CF_2CF_2CH_2O)_{a7}(CF(CF_3))_{a8}(CF_2)_{a9}(CH_2)_{a10}-O-[CF(CF_3)]_{a11}(CF_2)_{a12}(CH_2)_{a13}-$$ Formula (1):

(wherein, a1 to a13 are integers of 0 or more. However, at least one of a1 to a9 is an integer of 1 or more. The total of a1 to a10 is preferably 21 or less, while the total of a11 to a13 is preferably 6 or less. Moreover, repeating units in $CF_2O)_{a1}(CF_2CF_2O)_{a2}(CF_2CH_2O)_{a3}[CF(CF_3)CF_2O]_{a4}[CF(CF_3)CH_2O]_{a5}(CF_2CF_2CF_2O)_{a6}(CF_2CF_2CH_2O)_{a7}[CF(CF_3)]_{a8}(CF_2)_{a9}(CH_2)_{a10}$, as well as repeating units in $(CH(CF_3))_{a11}(CF_2)_{a12}(CH_2)_{a13}$ may each be randomly bonded.)

The fluoro(poly)ether-containing organic group of the $R^1$ is further preferably a group represented by any of the following formulas (2), (3), or (4).

$$F[CF(CF_3)CF_2O]_{b1}[CF(CF_3)CH_2O]_{b2}-[CF(CF_3)]_{b3}(CF_2)_{b4}(CH_2)_{b5}-$$ Formula (2):

(wherein, b1 to b5 are each an integer of 0 or more, b1+b2 is an integer of 1 or more, and b3+b4+b5 is an integer of 0 or more. b1+b2 is preferably 21 or less, more preferably 11 or less, and further preferably 6 or less. b3+b4+b5 is preferably 6 or less. Moreover, repeating units in $(CF(CF_3))_{b3}(CF_2)_{b4}(CH_2)_{b5}$ may each be randomly bonded.

$$F(CF_2CF_2CF_2O)_{c1}(CF_2CF_2CH_2O)_{c2}-[CF(CF_3)]_{c3}(CF_2)_{c4}(CH_2)_{c5}-$$ Formula (3):

(wherein, c1 to c5 are integers of 0 or more, c1+c2 is an integer of 1 or more, and c3+c4+c5 is an integer of 0 or more. c1+c2 is preferably 21 or less, more preferably 11 or less, and further preferably 6 or less. c3+c4+c5 is preferably 6 or less. Moreover, repeating units in $(CF(CF_3))_{c3}(CF_2)_{c4}(CH_2)_{c5}$ may each be randomly bonded.

$$F(CF_2)_{d1}(CH_2)_{d2}-O-(CH_2)_{d3}-$$ Formula (4):

(wherein, d1 and d2 are each an integer of 1 or more, while d3 is an integer of 0 or more. d1 is preferably 10 or less, while d2 and d3 are each preferably 6 or less.)

Particularly preferable fluoro(poly)ether-containing organic groups include the following groups.

$$F[CF(CF_3)CF_2O]_nCF(CF_3)CF_2O(CH_2)_3-$$

$$F[CF(CF_3)CF_2O]_nCF(CF_3)CH_2O(CH_2)_3-$$

$$F[CF(CF_3)CF_2O]_{n+1}CF(CF_3)(CH_2)_2-$$

$$F(CF_2)_m(CH_2)_2O(CH_2)_3-$$

In each of the abovementioned formulas, l is preferably 1 to 20, more preferably 1 to 10, and most preferably 1 to 5. Moreover, m is preferably 1 to 6.

Moreover, a small amount of the fluoro(poly)ether-containing organic groups may be bonded to the silicon atoms.

$$F[CF(CF_3)CF_2O]_oCF(CF_3)CF_2O-$$

$$F[CF(CF_3)CF_2O]_oCF(CF_3)CH_2O-$$

$$F(CF_2)_p(CH_2)_2O-$$

In the abovementioned formulas, o is preferably 1 to 20, more preferably 1 to 10, and most preferably 1 to 5. Moreover, p is preferably 1 to 6.

Component (B) according to the present invention may or may not have a group selected from fluoroalkyl groups and fluoro(poly)ether-containing organic groups. Even when an organohydrogenpolysiloxane having a fluorine atom-containing group is not used as component (B), when the present composition is combined with the abovementioned (A) and cured using the composition as a coating agent, a release layer having excellent releasability, particularly excellent releasability with respect to the silicone adhesive is obtained when the composition is cured using the composition as a coating agent.

When component (B) according to the present invention has a group selected from the group consisting of fluoroalkyl groups and fluoro(poly)ether-containing organic groups, the fluorine atom content derived from fluoroalkyl groups and/or fluoro(poly)ether-containing organic groups per molecule is not particularly limited, but is preferably at least 20 mass %, at least 25 mass %, at least 30 mass %, or at least 35 mass %. Moreover, the upper limit of the fluorine atom content in component (B) is preferably at most 60 mass %, or at most 50 mass %.

Specific examples of component (B) include, but are not limited to, the organopolysiloxanes listed below. In the following formulas, Me, Vi, Hex, and Fa1 respectively represent a methyl group, a vinyl group, an n-hexenyl group, and a 3,3,4,4,5,5,6,6,6-nonafluorohexyl group, while Fa4 is a group represented by the following formula:

$$F[CF(CF_3)CF_2O]_2-CF(CF_3)CH_2O-(CH_2)_3-$$

an organopolysiloxane represented by the average composition formula:

$$(Me_3SiO_{1/2})_2(Me(Fa1)SiO_{2/2})_{12}(MeHSiO_{2/2})_{27}$$

an organopolysiloxane represented by the average composition formula:

$$(Me_3SiO_{1/2})_2(Me_2SiO_{2/2})_{55}(Me(Fa4)SiO_{2/2})_{25}(MeHSiO_{2/2})_{25}$$

an organopolysiloxane represented by the average composition formula:

$$(Me_3SiO_{1/2})_2(MeHSiO_{2/2})_{50}$$

an organopolysiloxane represented by the average composition formula:

$$(Me_3SiO_{1/2})_2(Me_2SiO_{2/2})_{30}(MeHSiO_{2/2})_{30}$$

an organopolysiloxane represented by the average composition formula:

$$(Me_2HSiO_{1/2})_2(Me_2SiO_{2/2})_{30}(MeHSiO_{2/2})_{30}$$

One or more selected from these can be combined and used as component (B).

The content of component (B) in the curable silicone composition according to the present invention is an amount such that the molar ratio of the silicon-bonded hydrogen atoms to the alkenyl groups in component (A) is within a range of 0.1 to 20 (silicon atom-bonded hydrogen atoms/alkenyl groups), and is preferably within a given range with a lower limit of 0.5, 0.8, or 1 and an upper limit of 18, 17, 16, 15, 14, 13, or 12. This is because, when the content of component (B) is the lower limit of the abovementioned range or more, crosslinking of the curable silicone composition progresses sufficiently, while when the content is less than or equal to the upper limit of the range described above, the characteristics of the releasable film obtained by curing curable silicone composition may be stabilized.

(Component (C))

Component (C) is a hydrosilylation reaction catalyst for promoting curing with the hydrosilylation reaction of the curable silicone composition. Examples thereof include platinum-based catalysts, rhodium-based catalysts, and palladium-based catalysts, with platinum-based catalysts being preferable. Examples of the platinum based catalyst include platinum fine powder, platinum black, platinum supporting silica fine powder, platinum supporting activated carbon, chloroplatinic acid, alcohol solutions of chloroplatinic acid, olefin complexes of platinum, and alkenylsiloxane complexes of platinum.

The content of component (C) is an amount that can promote curing of the present curable silicone composition and is specifically an amount in which the metal atoms, preferably platinum atoms, in the catalyst are within a range of 0.1 to 1,000 pm in mass units with respect to the present curable silicone composition. This is because, when the amount of component (C) is greater than or equal to the lower limit of the range described above, curing of the resulting curable silicone composition progresses, while when the amount is less than or equal to the upper limit of the range described above, the resulting cured product becomes less susceptible to discoloration.

(Component (D))

Component (D) is any organic solvent capable of compatibilizing the entire composition while uniformly compatibilizing the mixture of two or more fluoroalkyl group-containing organopolysiloxanes serving as component (A). Here, "compatibilizing" means that turbidity is not observed in the appearance at 25° C., providing a uniform and transparent liquid.

Moreover, by adding an organic solvent, the viscosity of the curable silicone composition can be reduced, improving the application workability and wettability to the substrate.

Exemplary organic solvents used as component (D) include ethers such as diethyl ether, dipropyl ether, diisopropyl ether, dibutyl ether, diisobutyl ether, di-sec-butyl ether, di-tert-butyl ether, and methyl-tert-butyl ether, as well as pentane, with diisopropyl ether particularly preferable. In particular, using a fluorine-free organic solvent, the present invention can advantageously be carried out without using a fluorine-based solvent. However, a fluorine based solvent may be used in terms of improving application workability, such that the use of the fluorine based solvent in the practice of the present invention is not prevented.

Other organic solvents may be further used in addition to the abovementioned organic solvent, provided that the appearance of the curable silicone composition can be maintained transparent and uniform at 25° C. from the preparation of the composition until the use thereof. While not particularly limited thereto, exemplary such additional organic solvents include: hydrocarbon-based solvents such as aromatic hydrocarbon-based solvents such as toluene and xylene, aliphatic hydrocarbon-based solvents such as hexane, heptane, octane, isooctane, decane, cyclohexane, methylcyclohexane, and isoparaffin, industrial gasoline (rubber solvents or the like), petroleum benzene, and solvent naphtha; ketone-based solvents such as acetone, methyl ethyl ketone, 2-pentanone, 3-pentanone, 2-hexanone, 2-heptanone, 4-heptanone, methyl isobutyl ketone, diisobutyl ketone, acetonyl acetone, and cyclohexanone; ester-based solvents such as ethyl acetate, propyl acetate, isopropyl acetate, butyl acetate, and isobutyl acetate; solvents having ester and ether components such as 2-methoxyethylacetate, 2-ethoxyethylacetate, propylene glycol monoether acetate, and 2-butoxyethylacetate; siloxane-based solvents such as hexamethyl disiloxane, octamethyl trisiloxane, octamethyl cyclotetrasiloxane, decamethyl cyclopentasiloxane, tris(trimethylsiloxy)methylsilane, and tetrakis(trimethylsiloxy) silane; fluorine modified aromatic hydrocarbon based solvents such as 1,3-xylene hexafluoride and benzotrifluoride; fluorine modified ether based solvents such as methylheptafluoropropyl ether, methylnonafluorobutyl ether, ethylnonafluorobutyl ether, 3-methoxy-1,1,1,2,2,3,4,4,5,5,6,6,6-tridecafluorohexane, and perfluoro(2-butyltetrahydrofuran); fluorine modified alkylamine based solvents such as perfluorotributylamine and perfluorotripentylamine; and mixed solvents of two or more types selected therefrom.

The content of component (D) is an amount necessary to uniformly compatibilize the entire curable silicone composition, is 2,000 parts by mass or less per 100 parts by mass of component (A), and is preferably within a range of 20 to 1,800 parts by mass.

(Component (E))

The present curable silicone composition may also contain (E) a hydrosilylation reaction inhibitor in order to control the crosslinking reactions thereof. Examples of component (E) include: alkyne alcohols such as 1-ethynylcyclohexane-1-ol, 2-methyl-3-butyne-2-ol, 3,5-dimethyl-1-hexyne-3-ol, and 2-phenyl-3-butyne-2-ol; enyne compounds such as 3-methyl-3-pentene-1-yne and 3,5-dimethyl-3-hexene-1-yne; methyl alkenyl siloxane oligomers such as 1,3,5,7-tetramethyl-1,3,5,7-tetravinylcyclotetrasiloxane and 1,3,5,7-tetramethyl-1,3,5,7-tetrahexenylcyclotetrasiloxane; alkynoxysilanes such as dimethyl bis(3-methyl-1-butyne-3- oxy)silane and methylvinyl bis(3-methyl-1-butyne-3-oxy) silane; alkyneoxysilane compounds such as methyltris(1-methyl-1-phenyl-propyneoxy)silane, dimethylbis(1-methyl-1-phenyl-propyneoxy)silane, methyltris(1,1-dimethyl-propyneoxy)silane, dimethylbis(1,1-dimethyl-propyneoxy) silane; and benzotriazoles.

The content of component (E) is not limited, and in terms of imparting sufficient pot-life to the present curable silicone composition, the content of component (E) upon use thereof is preferably within a range of from 0.01 to 5 parts by mass, within a range of from 0.05 to 5 parts by mass, or within a range of from 0.05 to 3 parts by mass with respect to 100 parts by mass of component (A).

[Other Additives]

The present curable silicone composition may use an additive selected from a photopolymerization initiator, an antioxidant, a reactive diluent, a leveling agent, a filler, an antistatic agent, an antifoaming agent, a pigment, etc. as long as the object of the present invention can be achieved.

[Application]

The curable silicone composition according to the present invention is preferably used as a release coating agent and is suitable for use as a release coating agent for an adhesive. In particular, the curable silicone composition is most suitable for use as a release coating agent for silicone adhesives.

The present invention also relates to a release film including: a substrate, specifically, a film-like substrate; and a release layer consisting of a curable silicone composition according to the present invention or a cured product thereof. Such a release film can be manufactured by, for example, applying the curable silicone composition according to the present invention to a film-like substrate and curing the curable silicone composition.

A film-like substrate selected from a paper or plastic film, glass, metal, etc. can be used as the substrate employed for the release film. Examples of paper include high quality paper, coated paper, art paper, glassine paper, polyethylene laminate paper, and craft paper. Examples of plastic films include polyethylene films, polypropylene films, polyester films, polyimide films, polyvinyl chloride films, polyvinylidene chloride films, polyvinyl alcohol films, polycarbonate films, polytetrafluoroethylene films, polystyrene films, ethylene-vinyl acetate copolymer films, ethylene-vinyl alcohol copolymer films, triacetyl cellulose films, polyether ether ketone films, and polyphenylene sulfide films. The substrate on which the release layer is provided does not need to be a film-like substrate, with a substrate of any shape capable of being used. When the glass, for example, a sheet-like glass, is used as the substrate, the glass is not particularly limited in terms of thickness, type, or the like, and may be subjected to chemical reinforcement treatment or the like. In addition, glass fibers may also be used as substrates, with glass fibers capable of being used alone or in combination with another resin. Examples of metal substrates include aluminum foil, copper foil, gold foil, silver foil, and nickel foil. If a product provided on the substrate is used as a release film, the substrate is preferably a plastic film, more preferably a polyester film. In particular, both the substrate and the release layer are preferably optically transparent.

The thickness of the release layer is preferably 2.0 µm or less, 1.0 µm or less, or 0.5 µm or less, more preferably 0.4 µm or less, and further preferably 0.3 µm or less. Moreover, the thickness is preferably 0.05 µm or more, more preferably 0.1 µm or more. This is because, if the film thickness is at the lower limit or higher of the abovementioned range, the release force of the obtained release layer is sufficiently low; in contrast, if the film thickness is at the upper limit or lower of the abovementioned range, the light transmittance of the release layer is particularly excellent. The release agent according to the present invention particularly allows the release layer formed from the release agent to achieve a low release force even when thin, advantageously making it possible to design the release layer to be 0.5 µm or less.

[Laminate Body]

The present invention also relates to a laminate which is configured so as to include at least: a release layer consisting of a cured product obtained by curing the curable silicone composition according to the present invention; and an adhesive layer disposed so as to face the release layer, in particular a silicone adhesive layer. In this case, the curable silicone composition can be a release coating agent. In this case, the meaning of "facing" means that the release layer and the adhesive layer are in direct contact. Therefore, in the present invention, the release layer and the adhesive layer are generally disposed so as to face each other. In the following description, while a silicone adhesive agent is used as an example to describe the configuration of the laminate according to the present invention, the adhesive agent is not limited to the silicone adhesive.

The laminate according to the present invention may be a laminate having any structure as long as the release layer and the silicone adhesive layer are disposed so as to face each other. Specific examples of laminates are described below.

Examples of the configuration of the laminate according to the present invention include the following (a) to (d).
(a) a configuration consisting of a first substrate/release layer/silicone adhesive layer/second substrate;
(b) a configuration formed by continuously laminating two or more configuration units consisting of a substrate/release layer/silicone adhesive layer;
(c) a configuration consisting of a first substrate/first release layer/silicone adhesive layer/second release layer/second substrate; and
(d) a configuration formed by continuously laminating two or more configuration units consisting of a substrate/first release layer/silicone adhesive layer/second release layer.

In configurations (b) and (d), the substrate may be discontinuous or continuous; wherein, in general, if the substrate is discontinuous, the laminate is formed into a sheet shape, while when a continuous material is used, the laminate is rolled.

The configurations (a) to (d) of the laminate will be described in further detail.

<Regarding Configuration (a)>

Figure 1:
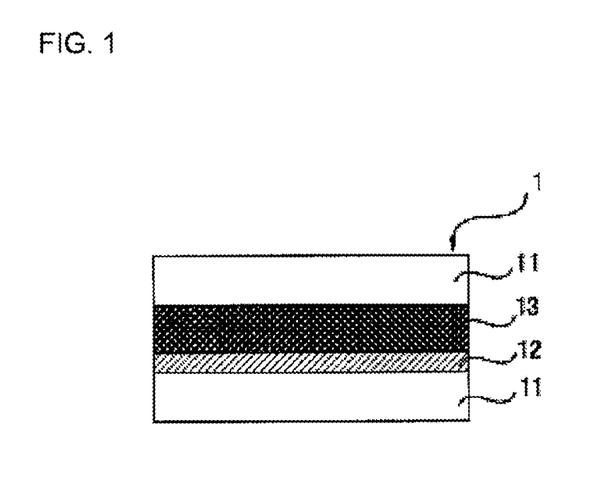
FIG. 1 is a cross sectional view of a laminate illustrating one embodiment of the present invention.

The laminate of configuration (a) has a configuration including a first substrate, a release layer disposed on the first substrate, a silicone adhesive layer disposed on the release layer, and a second substrate disposed on the silicone adhesive layer, wherein the release layer consists of a cured product formed by curing the release coating agent according to the present invention. The laminate of configuration (a) can be part of a laminate which includes not only the laminate itself, but also the configuration thereof. A schematic view of configuration (a) is illustrated in FIG. 1.

<Regarding Configuration (b)>

Figure 2:
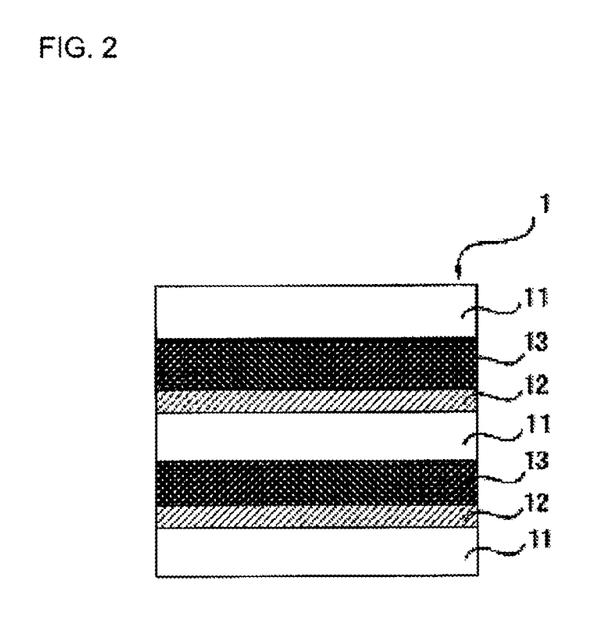
FIG. 2 is a cross sectional view of a laminate illustrating one embodiment of the present invention.

The laminate of configuration (b) has a configuration formed by continuously laminating two or more configuration units consisting of a first substrate, a first release layer disposed on the first substrate, and a silicone adhesive layer disposed on the first release layer, wherein the release layer consists of a cured product formed by curing the release coating agent according to the present invention. Further, a new substrate is preferably disposed on the silicone adhesive layer disposed on the outermost layer of the configuration. The laminate of configuration (b) can be part of a laminate which includes not only the laminate itself, but also the configuration thereof. FIG. 2 illustrates a schematic view of one example of configuration (b). In FIG. 2, there are two of the abovementioned successive configuration units, wherein a new substrate is disposed on the silicone adhesive layer disposed on the outermost layer of the configuration. However, configuration (b) is not limited to the aspect illustrated in FIG. 2.

<Regarding Configuration (c)>

Figure 3:
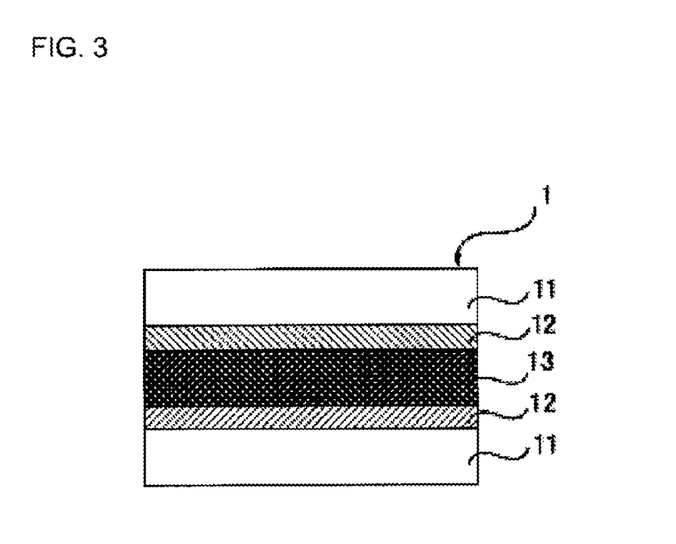
FIG. 3 is a cross sectional view of a laminate illustrating one embodiment of the present invention.

The laminate of configuration (c) has a configuration including a first substrate, a first release layer disposed on the first substrate, a silicone adhesive layer disposed on the first release layer, a second release layer disposed on the silicone adhesive layer, and a second substrate disposed on the second release layer, wherein one or both of the first release layer and the first release layer consist(s) of a cured product formed by curing the release coating agent according to the present invention. The laminate of configuration (c) can be part of a laminate which includes not only the laminate itself, but also the configuration thereof. A schematic view of one example of configuration (c) is illustrated in FIG. 3.

<Regarding Configuration (d)>

Figure 4:
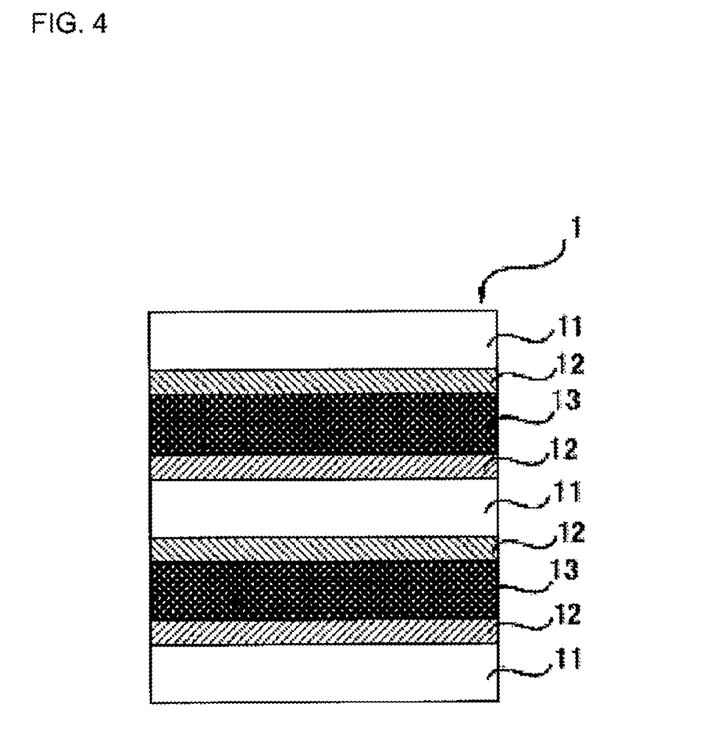
FIG. 4 is a cross sectional view of a laminate illustrating one embodiment of the present invention.

The laminate of configuration (d) has a configuration formed by continuously laminating two or more configuration units consisting of a first substrate, a first release layer disposed on the first substrate, a silicone adhesive layer disposed on the first release layer, and a second release layer disposed on the silicone adhesive layer, wherein one or both of the first release layer and the second release layer consist(s) of a cured product formed by curing the release coating agent according to the present invention. Further, a new substrate is preferably disposed on the release layer disposed on the outermost layer of the configuration. The laminate of configuration (d) can be part of a laminate which includes not only the laminate itself, but also the configuration thereof. FIG. 4 illustrates a schematic view of one example of configuration (d). In FIG. 4, there are two of the abovementioned successive configuration units, wherein a new substrate is disposed on the release layer disposed on the outermost layer of the configuration. However, configuration (b) is not limited to the aspect illustrated in FIG. 4.

In configurations (b) and (d) of the abovementioned laminate, if the substrate is discontinuous (sheet shaped), all of the substrate, the release layer, and the silicone adhesive layer may be the same or different from each other, including the types and thicknesses thereof. Moreover, when the substrate is continuous (roll shaped), the substrate, the silicone adhesive layer, and the one or two release layers are each identical.

Such a substrate is preferably sheet-like or film-like and is particularly preferably a film-like substrate, with a substrate similar to the substrate used in the release film capable of being used.

Moreover, such a substrate which is light transmissive or light non-transmissive may be used, wherein, if multiple substrates are used, both light transmissive and light non-transmissive ones may be optionally combined depending on the purpose.

The laminate according to the present invention preferably has a roll shape, for example, a roll shape wound around an appropriate cylindrical or tubular core.

In the laminate of the present invention, in the configuration (for example, corresponding to configuration (c) or (d)) in which a first release layer is disposed so as to face one surface of both surfaces with respect to the silicone adhesive layer and a second release layer is disposed so as to face the other surface, at least one of the first release layer and the second release layer must be a release layer consisting of a cured product formed by curing the release coating agent according to the present invention, wherein the release force (F1) upon releasing the silicone adhesive from the first release layer preferably differs from the release force (F2) upon releasing the silicone adhesive from the second release layer.

When the difference in the release force between F1 and F2 is small, after the operation of releasing one of the release layers from the silicone adhesive layer (releasing the first facing surface), upon releasing the first opposing surface in the operation of releasing the other release layer (second facing surface), the second facing surface may be unintentionally released, at which time, the silicone adhesive layer may be broken, making it difficult to be used as an originally intended adhesive. The release force difference is preferably 10 gf/inch or more, more preferably 20 gf/inch or more.

Exemplary methods for achieving the abovementioned release force difference include a method for selecting a method for forming the facing surfaces as described below, a method for making two types of release layers different, etc.

In the laminate according to the present invention, the thickness of the release layer is independently 2.0 µm, 1.0 µm, or 0.5 µm or less, more preferably 0.4 µm or less, and further preferably 0.3 µm or less. Moreover, it is preferably 0.05 µm or more, more preferably 0.1 µm or more. This is because, if the film thickness of the release layer is at the lower limit or higher of the abovementioned range, the release force of the release layer from the silicone adhesive is sufficiently low; in contrast, if the film thickness is at the upper limit or lower of the abovementioned range, the light transmittance of the release layer is particularly excellent and the economics thereof are also excellent.

The silicone adhesive composition or the curable silicone adhesive composition which can be used in the laminate according to the present invention is not limited to a specific substance, with those that conform to any desired laminate application, for example, any application as an adhesive tape, capable of being used, wherein an adhesive having a relatively high adhesive force is preferably used.

The curing mechanism of the curable silicone adhesive is not particularly limited, with hydrosilylation curability, peroxide curability, photocuring, etc. capable of being used. However, curing at a relatively low temperature can be carried out and the effects of heat on the substrate and the application material can be reduced, with hydrosilylation curing properties having excellent economics including ease of step preferably used.

A commercially available composition may be used as such a silicone pressure-sensitive adhesive composition. As such a silicone pressure-sensitive adhesive, hydrosilylation curable SD 4580 PSA, SD 4584 PSA, SD 4585, etc. manufactured by Dow Corning Toray Co., Ltd. can be used. Moreover, a silicone adhesive agent having large elongation at break is preferably used with the storage modulus at low temperatures kept lower wherein, in assembling applications, particularly OCA applications, high adhesion and high flexibility may be required over a wider temperature range including low temperatures, such that the glass transition temperature of the cured adhesive composition is low; for example, the composition can be designed to be room temperature or lower. Examples thereof include silicone adhesive compositions proposed by the present applicant in WO 2017/188308, etc.

While not particularly limited thereto, the thickness of the silicone adhesive layer of the laminate according to the present invention is preferably 0.1 to 300 μm, more preferably 0.5 to 200 μm.

Moreover, in the laminate according to the present invention, the silicone adhesive layer can be formed on the entire surface of the layer or on only a portion of the surface thereof. Although no particular limitations are placed on aspects in which the silicone adhesive layer is formed on only a portion of the surface, silicone adhesive agents may be applied so as to form any shape such as one or more points, one or more straight lines or curved lines, and concentric circles. The release layer may also be formed on the entire surface configuring the release layer, while the release layer may be formed in accordance with the shape of the silicone adhesive formed on the silicone adhesive layer.

[Manufacturing Method of Laminate]

While the method for manufacturing the laminate according to the present invention is not particularly limited, some preferable methods are listed below.

First, the following two methods are exemplified as methods for preparing the facing surfaces of the silicone adhesive layer and the release layer in manufacturing the laminate according to the present invention.

<Method (1) for Preparing the Facing Surfaces of the Silicone Adhesive Layer and the Release Layer>

The first method for preparing the facing surface includes:
  Step (1) involving forming a first release film including a first release layer by applying and curing a release coating agent consisting of the curable silicone composition according to the present invention on a film-like substrate;
  Step (2) involving forming a silicone adhesive layer by applying and curing a curable silicone adhesive composition on a film-like substrate that is the same as the film-like substrate or a second film-like substrate that is different from the film-like substrate;
  Step (3) involving pasting together the release layer of the first release film obtained by the aforementioned step (1) on the silicone adhesive layer obtained by step (2).

The preparation method is a method in which a previously cured release layer and a previously cured silicone adhesive layer are brought into contact with each other to form facing surfaces of both layers.

<Method (2) for Preparing the Facing Surfaces of the Silicone Adhesive Layer and the Release Layer>

The second method for preparing the facing surface includes:
  Step (1) involving forming a first release film including a first release layer by applying and curing a release coating agent consisting of the curable silicone composition according to the present invention on a film-like substrate;
  Step (2) involving forming a silicone adhesive layer by applying and curing a curable silicone adhesive composition on the first release film obtained by step (1); and
  Step (3) involving pasting together a film-like substrate that is the same as or different from the film substrate on the silicone adhesive layer obtained by step (2).

The preparation method is a method in which a curable silicone adhesive is applied and cured on a previously cured release layer to form facing surfaces of both layers.

In general, compared to the first method, the second method often has a high release force difference between the silicone adhesive and the release agent.

Next, the manufacturing methods are exemplified for configuration examples (a) to (d) of the abovementioned laminate according to the present invention. Of these, the facing surfaces of the silicone adhesive and the release agent are appropriately used in the abovementioned preparation method (1) or (2) of facing surfaces.

<Configuration (a) Corresponding to a Single Layer on One Side, for Example, a Sheet Shape>

The abovementioned method (1) or (2) for preparing the facing surfaces of the silicone adhesive layer and the release layer in the manufacturing method of configuration (1) can be applied as is. While not limited thereto, the method is described with reference to a sheet laminate.

<Configuration (b), Corresponding to a Single Sided Multilayer, for Example, a Sheet or Roll Shape>

One aspect of configuration (b) can be manufactured, for example, via a manufacturing method including the following steps (1) to (3):
  Step (1) involving forming a release film including a release layer by applying and curing a release coating agent consisting of the curable silicone composition according to the present invention on a film-like substrate;
  Step (2) involving forming a silicone adhesive layer on the film substrate by applying and curing a curable silicone adhesive composition on a surface opposite the release film of the release layer; and
  Step (3) involving further pasting together the silicone adhesive layer and the release layer on both ends of this laminate.

While the above relates to the sheet laminate, step (3) can also be performed by winding the laminate formed via steps (1) and (2) into a roll shape. Step (3) may also be a step in which two or more laminates produced by steps (1) and (2) can be pasted together to form a rolled laminate. When the outermost surface of the roll is a silicone adhesive layer, the release film is preferably laminated on the further outer side thereof.

<Configuration (c) Corresponding to a Double Sided Single Layer, for Example, a Sheet Shape>

One aspect of configuration (c) can be manufactured, for example, via a manufacturing method including the following steps (1) to (4):
  Step (1) involving forming a first release film including a first release layer by applying and curing a release coating agent consisting of the curable silicone composition according to the present invention on a film-like substrate;
  Step (2) involving forming a silicone adhesive layer on the first release layer by applying and curing a curable silicone adhesive composition on the first release layer of the first release film;
  Step (3) involving forming a second release film with a second release layer by applying and curing a release coating agent consisting of a curable silicone composition according to the present invention, which is the same as or different from that used to form the first release layer, on a second film-like substrate that is the same as the film-like substrate or a second film-like substrate that is different from the film-like substrate;
  Step (4) involving pasting together the second release layer of the second release film obtained by the abovementioned step (3) on the silicone adhesive layer obtained by step (2).

<Configuration (d), Corresponding to a Double Sided Multilayer, for Example, a Sheet or Roll Shape>

One aspect of configuration (b) can be manufactured, for example, via a manufacturing method including the following steps (1) to (4):

Step (1) involving forming a first release film including a first release layer by applying and curing a release coating agent consisting of the curable silicone composition according to the present invention on a film-like substrate;

Step (2) involving forming a release film with first and second release layers by applying and curing a release coating agent consisting of a curable silicone composition according to the present invention, which is the same as or different from that used to form the first release layer, on a surface opposite the first release film of the first release layer; and Step (3) involving forming a silicone adhesive layer on the first (or second) release layer by applying and curing a curable silicone adhesive composition on the first (or second) release layer (3); and Step (4) involving further pasting together the silicone adhesive layer and the second (or first) release layer on both ends of this laminate.

While the above relates to the sheet laminate, step (4) can also be performed by winding the laminate formed via steps (1), (2), and (3) into a roll shape. Step (4) can also form a rolled laminate by pasting together two or more laminates produced by steps (1), (2), and (3). When the outermost surface of the roll is a silicone adhesive layer, the release film is preferably laminated on the further outer side thereof.

Further, in the laminate according to the present invention, the silicone adhesive layer itself can also be configured by a laminate including a silicone adhesive layer on both surfaces of the substrate. In this case, the same or different two silicone adhesive layers can be used.

Such a laminate including a silicone adhesive layer having a laminate structure can be manufactured via a method including the following steps (1) to (6).

Step (1) involving forming a first release film including a first release layer by applying and curing a release coating agent consisting of the curable silicone composition according to the present invention on a film-like substrate;

Step (2) involving forming a first silicone adhesive layer by applying and curing a curable silicone adhesive composition on a film-like substrate that is the same as or different from the film-like substrate;

Step (3) involving pasting together the release layer of the first release film obtained by the aforementioned step (1) on the first silicone adhesive layer obtained by step (2);

Step (4) involving forming a second release film with a second release layer by applying and curing a release coating agent consisting of a curable silicone composition according to the present invention, which is the same as or different from that used to form the first release layer, on a second film-like substrate that is the same as or different from the film-like substrate; and Step (5) involving applying and curing a curable silicone adhesive composition, which is the same as or different from the silicone adhesive composition, on the surface (the surface of the substrate) opposite the surface in which the silicone adhesive layer is provided in step (2), to form a second silicone adhesive layer;

Step (6) involving pasting together the release layer of the second release film obtained by the aforementioned step (4) on the second silicone adhesive layer obtained by step (5).

The conditions for each of the abovementioned steps are not particularly limited as long as the curable silicone composition and the curable silicone adhesive composition can be respectively cured to form the desired release layer and adhesive layer. Moreover, the curing conditions of those curable compositions are well known to those skilled in the art, with optimal conditions capable of being selected without excessive trial and error.

In addition to the abovementioned method for manufacturing the laminate, the laminate according to the present invention can be manufactured by sequentially creating each layer on a substrate, or by pasting together parts separately created on two substrates, wherein the method can be easily considered by those skilled in the art based on common technical knowledge.

EXAMPLES

The composition for a silicone pressure-sensitive adhesive and the releasable film of the present invention will be described in further detail hereinafter using examples. Note that in the below-mentioned average composition formula, the symbol Me represents a methyl group, while Vi represents a vinyl group. Moreover, the method for determining the release force upon releasing the silicone adhesive from the release film as well as the adhesion retention ratio (also referred to as the residual adhesion ratio) of the silicone adhesive upon releasing the release film is as described below.

REFERENCE EXAMPLES

Preparation of the "Hydrosilylation Curable Silicone Adhesive Composition Solution"

30.0 parts by mass of a xylene solution (solid content: 68%) of MQ silicone resin (molecular weight: 2,600, amount of hydroxyl groups: 3% by mass) consisting of $(CH_3)_3SiO_{1/2}$ units, $SiO_{4/2}$ units, and hydroxyl groups; 21.9 parts by mass of a xylene solution (solid content: 76%) of MQ silicone resin (molecular weight: 3,300, amount of hydroxyl groups: 1% by mass) consisting of $(CH_3)_3SiO_{1/2}$ units, $SiO_{4/2}$ units, and hydroxyl groups; 26.4 parts by mass of a vinyl functional dimethylpolysiloxane (molecular weight: 650,000, vinyl group amount: 0.01% by mass); and 67.9 parts by mass of toluene were sufficiently mixed well to form a uniform solution.

146.2 g of the abovementioned solution, 0.50 g of a dimethylsiloxane/methylhydrogensiloxane copolymer blocked with trimethylsiloxy groups at both molecular terminals (molecular weight: 1,600, silicon atom-bonded hydrogen atom content: 0.73 mass %), 0.50 g of a 20 mass % toluene solution of 1-ethynyl-1-cyclohexanol, and 0.50 g of a platinum-based hydrosilylation reaction catalyst (platinum metal content: 0.52 mass %) were sufficiently mixed to form a uniform solution.

<Method for Determining the Release Force 1>

The curable silicone release agent composition was applied on a polyethylene terephthalate (hereinafter, abbreviated as a PET) film (available from Toray Industries, Inc., product name: Lumirror (trade name) S10, thickness: 50 µm) so as to give a release agent layer thickness of 1 µm after curing using an applicator, then cured by heating for 3 minutes at 150° C. to create a "release film 1" having a cured silicone release layer. The "hydrosilylation curable silicone adhesive composition solution" of the abovementioned reference example was applied on the release layer of the "release film 1" using an applicator so as to give a film thickness of 50 μm after curing, then cured by heating for 6 minutes at 160° C. to form a silicone adhesive layer. The PET film was pasted together on the obtained silicone adhesive layer using a 2 kg hand roller. The obtained film was cut to a width of 1 inch and the "release film 1" was pulled at a speed of 1.0 m/minute in the 180° direction using a tensile tester (RTC-1210 available from Orientec Co., Ltd.), then the force (release force 1) required to release the release film 1 from the silicone adhesive layer at 25° C. was determined.

<Method for Determining the Residual Adhesion Ratio 1>

An adhesive layer of a test piece consisting of the PET film substrate and the silicone adhesive layer after the determination of the release force described above was pasted together on a 2 mm thick polymethyl methacrylate (hereinafter, abbreviated as a PMMA) plate using a 2 kg hand roller. Subsequently, the silicone adhesive layer was pulled with the PET film substrate at a speed of 0.3 m/minute in the 180° direction and the force (adhesive force F1) required to release the silicone adhesive from the PMMA plate at 25° C. was determined.

Separately, the hydrosilylation curable silicone adhesive solution obtained in the abovementioned reference example was applied on the PET film using an applicator so as to give a film thickness of 50 μm after curing, then cured by heating for 6 minutes at 160° C. to form a silicone adhesive layer. The film was cut to a width of 1 inch and the adhesive layer was pasted together on the same 2 mm thick PMMA plate as described above using a 2 kg hand roller. Subsequently, the silicone adhesive layer was pulled with the PET film at a speed of 0.3 m/minute in the 180° direction and the force (adhesive force F2) required to release the silicone adhesive from the PMMA plate at 25° C. was determined. The residual adhesion ratio 1 was determined from the adhesive strength F1 and the adhesive force F2 according to the following formula.

Residual adhesion ratio 1(%)=(adhesive force $F1$/adhesive force $F2$)*100(%)

<Method for Determining the Releasing Force 2>

The hydrosilylation curable silicone release agent composition solution was applied on a PET film so as to give a release agent layer thickness of 1 μm after curing using an applicator, then cured by heating for 3 minutes at 150° C. to create a "release film 1" having a cured silicone release layer.

Separately, the hydrosilylation curable silicone adhesive composition solution was applied on the PET film using an applicator so as to give a film thickness of 50 μm after curing, then cured by heating for 6 minutes at 160° C. The release film 2 was pasted together on this adhesive layer using a 2 kg hand roller. After cooling, this film was cut to a width of 1 inch and the "release film" was pulled at a speed of 1.0 m/minute in the 180° direction using a tensile tester (RTC-1210), then the force (release force 2) required to release the release film 2 from the silicone adhesive layer at 25° C. was determined.

<Method for Determining the Residual Adhesion Ratio 2>

An adhesive layer of a test piece consisting of the PET film substrate and the silicone adhesive layer after the determination of the release force 2 described above was pasted together on a 2 mm thick PMMA plate using a 2 kg hand roller. Subsequently, the silicone adhesive layer was pulled with the PET film substrate at a speed of 0.3 m/minute in the 180° direction and the force (adhesive force F3) required to release the silicone adhesive from the PMMA plate at 25° C. was determined. The residual adhesion ratio 2 was determined from the adhesive force F2 determined in the determination of the adhesive force F3 and the residual adhesion ratio 1 according to the following formula.

Residual adhesion ratio 2(%)=(adhesive force $F3$/adhesive force $F2$)*100(%)

The raw materials used in examples and comparative examples are as follows. In the following, the vinyl group content indicates the content (mass %) of $CH_2=CH$-groups per molecule.

(A-1): a fluoroalkyl group- and alkenyl group-containing organopolysiloxane having a fluorine atom content of 40 mass % or more (i) Polymer 1 a fluoroalkyl group and alkenyl group-containing organopolysiloxane represented by the average composition formula:

wherein the vinyl group content is 0.042 mass %, (Me($C_4F_9CH_2CH_2$)$SiO_{2/2}$) units are 43 mole % of all diorganosiloxane units (D units), and the fluorine content is 42 mass %.

(ii) Polymer 2 a fluoroalkyl group and alkenyl group-containing organopolysiloxane represented by the average composition formula:

wherein the vinyl group content is 0.051 mass %, (Me($C_4F_9CH_2CH_2$)$SiO_{2/2}$) units are 50 mole % of all diorganosiloxane units (D units), and the fluorine content is 45 mass %.

(A-2): a fluoroalkyl group- and alkenyl group-containing organopolysiloxane having a fluorine atom content of less than 40 mass %

Polymer 3 a fluoroalkyl group and alkenyl group-containing organopolysiloxane represented by the average composition formula:

wherein the vinyl group content is 0.16 mass %, (Me($C_4F_9CH_2CH_2$)$SiO_{2/2}$) units are 33 mole % of all diorganosiloxane units (D units), and the fluorine content is 38 mass %.

An organopolysiloxane having an average of at least three SiH groups per molecule (designated as a SiH polymer in Tables 1 and 2) represented by the average compositional formula:

wherein the silicon-bonded hydrogen atom content is 0.49 mass %, (Me($C_4F_9CH_2CH_2$)$SiO_{2/2}$) units are 31 mole % of all diorganosiloxane units (D units), and the fluorine content is 38 mass %.

(C) Hydrosilylation Catalyst 1,3-divinyl-1,1,3,3-tetramethyldisiloxane platinum complex (added as a master batch in a vinyl group-containing dimethylpolysiloxane) (270 ppm of platinum metal was added to the amount of solid content in the curable composition).
(D) Organic Solvent
Diisopropylether (designated as an IPE in Tables 1 and 2)
[Mixing Test]
When polymer 1 and polymer 3 were placed in a transparent glass vial with a lid at a mass ratio of 1:1 and the mixture was sufficiently stirred and mixed at 25° C., the mixture was cloudy and not uniformly transparent. The mixture was left to stand at 25° C. and the appearance was again observed after 24 hours and found to have remained cloudy. Note that polymer 1 and polymer 3 are each a transparent liquid at 25° C.

When polymer 2 and polymer 3 were mixed and tested via the same method as described above at a mass ratio of 1:1, the mixture of polymer 2 and polymer 3 also had a cloudy appearance at 25° C. and remained cloudy even after being left to stand for 24 hours. Note that polymer 2 is a transparent liquid at 25° C.

In contrast, when polymer 1 and polymer 2 were mixed and tested via the same method as described above, the mixture of polymer 1 and polymer 2 had a uniform and transparent appearance at 25° C. and a uniform and transparent appearance even after being left to stand for 24 hours.

Examples 1 to 4 and Comparative Examples 1 and 2

A curable silicone composition was prepared according to the composition indicated in Table 1 below and was used as a release coating agent to prepare the release film according to the abovementioned method so as to determine the release force upon releasing the release film from the silicone adhesive layer, as well as the residual adhesion ratio of the adhesive layer to the polymethylmethacrylate resin upon releasing the release film.
The curable silicone composition serving as the release coating agent of Examples 1 to 6 was uniformly transparent at 25° C.

Examples 5 to 6 and Comparative Example 3

A curable silicone composition was prepared according to the composition indicated in Table 2 below and this was used as a release coating agent to prepare the release film according to the abovementioned method so as to determine the release force upon releasing the release film from the silicone adhesive layer, as well as the residual adhesion ratio of the silicone adhesive layer to the PMMA plate upon releasing the release film.

TABLE 2

Compositions and evaluation results of Examples 5 and 6 and Comparative Example 3

| Component | | Units of component amount | Examples 5 | Examples 6 | Comparative Examples 3 |
|---|---|---|---|---|---|
| (A-1) | Polymer 1 | parts by mass | | | |
| (A-1) | Polymer 2 | parts by mass | 80 | 60 | 100 |
| (A-2) | Polymer 3 | parts by mass | 20 | 40 | |
| (B) | SiH polymer | parts by mass | 4.41 | 4.86 | 10.00 |
| (C) | Pt catalyst | ppm | 270 | 270 | 270 |
| (D) | Solvent (IPE) | parts by mass | 870 | 870 | 870 |
| | SiH/Vi molar ratio | | 7.8 | 6.6 | 10.0 |
| Measurement method and measurement results | | | | | |
| Release force 1 | | gf/inch | 80 | 100 | 130 |
| Release force 2 | | gf/inch | 30 | 30 | 100 |
| Residual adhesion ratio 1 | | % | 93 | 95 | 99 |
| Residual adhesion ratio 2 | | % | 97 | 95 | 99 |

It can be seen from the results indicated in Tables 1 and 2 that, compared to release coating agents using each of polymer 1 and polymer 2 alone, release coating agents including a combination of polymer 1 and polymer 2 which

TABLE 1

[Compositions and evaluation results of Examples 1 to 4 and Comparative Examples 1 and 2]

| Component | | Units of component amount | Examples 1 | Examples 2 | Examples 3 | Examples 4 | Comparative Examples 1 | Comparative Examples 2 |
|---|---|---|---|---|---|---|---|---|
| (A-1) | Polymer 1 | parts by mass | 80 | 60 | 40 | 20 | 0 | 100 |
| (A-1) | Polymer 2 | parts by mass | | | | | | |
| (A-2) | Polymer 3 | parts by mass | 20 | 40 | 60 | 80 | 100 | 0 |
| (B) | SiH polymer | parts by mass | 3.92 | 4.49 | 5.07 | 5.64 | 6.22 | 3.95 |
| (C) | Pt catalyst | ppm | 270 | 270 | 270 | 270 | 270 | 270 |
| (D) | Solvent (IPE) | parts by mass | 870 | 870 | 870 | 870 | 870 | 870 |
| | SiH/Vi molar ratio | | 7.8 | 6.6 | 5.9 | 5.4 | 5.0 | 10.0 |
| Determination method and determination results | | | | | | | | |
| Release force 1 | | gf/inch | 85 | 70 | 95 | 130 | 185 | 120 |
| Release force 2 | | gf/inch | 30 | 20 | 26 | 30 | 45 | 46 |
| Residual adhesion ratio 1 | | % | 94 | 93 | 95 | 95 | 100 | 97 |
| Residual adhesion ratio 2 | | % | 92 | 91 | 91 | 92 | 90 | 94 | do not compatibilize even when mixed at 25° C. have the effects of reducing the release force between the silicone adhesive layer and the release layer and facilitating releasing, without significantly reducing the residual adhesive force of the adhesive layer.

INDUSTRIAL APPLICABILITY

Because the release film including the release layer formed using the curable silicone composition according to the present invention as a release coating agent for a silicone adhesive has properties of being able to release the release film from the silicone adhesive via weak force, in addition to maintaining the high adhesive force of the silicone adhesive upon releasing the release film, the curable silicone composition according to the present invention is useful as a release coating agent for a release film for a silicone adhesive.

DESCRIPTION OF THE REFERENCE NUMERALS

1 Laminate body
11 Substrate
12 Release layer
13 Adhesive layer

The invention claimed is:
1. A curable silicone composition, comprising:
(A) a mixture of two or more fluoroalkyl group-containing organopolysiloxanes having a fluoroalkyl group and at least two alkenyl groups per molecule, wherein the contents of the fluoroalkyl groups differ from each other, and wherein the two or more fluoroalkyl group-containing organopolysiloxanes are a combination of those which are not completely compatibilized at 25° C. when mixed in the absence of a solvent;
(B) an organopolysiloxane having at least three silicon-bonded hydrogen atoms per molecule;
(C) an effective amount of a hydrosilylation reaction catalyst; and
(D) an organic solvent capable of compatibilizing the entire composition by uniformly compatibilizing the mixture of two or more fluoroalkyl group-containing organopolysiloxanes serving as component (A);
wherein component (A) is a mixture of:
(A1) one or more linear or branched organopolysiloxanes comprising fluoroalkyl group-containing organodisiloxane units and having a fluorine atom content of 40 mass % or more; and
(A2) one or more linear or branched organopolysiloxanes comprising fluoroalkyl group-containing organodisiloxane units and having a fluorine atom content of less than 40 mass %; and
wherein the difference between the fluorine atom content (mass %) of component (A1) and the fluorine atom content (mass %) of component (A2) is 3 mass % or more.
2. The curable silicone composition according to claim 1, wherein the content of component (B) is such that the molar ratio of silicon-bonded hydrogen atoms in component (B) to alkenyl groups in component (A) is within the range of 0.1 to 20 (silicon atom-bonded hydrogen atoms (B)/alkenyl groups (A)).
3. The curable silicone composition according to claim 1, wherein component (A) is a mixture of:
(A1) one or more linear or branched organopolysiloxanes comprising fluoroalkyl group-containing organodisiloxane units, wherein the fluoroalkyl group is a 3,3,4,4,5,5,6,6,6-nonafluorohexyl group, and wherein the units are 39 mole % or more of the total organosiloxane units; and
(A2) one or more linear or branched organopolysiloxanes comprising fluoroalkyl group-containing organodisiloxane units, wherein the fluoroalkyl group is a 3,3,4,4,5,5,6,6,6-nonafluorohexyl group, and wherein the units are 36 mole % or less of the total organosiloxane units.
4. The curable silicone composition according to claim 1, wherein the mass ratio of component (A1) to component (A2) is 1/99 to 99/1 (component (A1):component (A2)).
5. The curable silicone composition according to claim 1, wherein the organic solvent (D) is a solvent mixture consisting of one solvent or two or more solvents selected from the group consisting of diethyl ether, dipropyl ether, diisopropyl ether, dibutyl ether, diisobutyl ether, di-sec-butyl ether, di-tert-butyl ether, methyl-tert-butyl ether, ethyl-tert-butyl ether, and pentane.
6. The curable silicone composition according to claim 1, further comprising (E) a hydrosilylation reaction inhibitor.
7. A release coating agent comprising the curable silicone composition according to claim 1.
8. A curable silicone composition, comprising:
(A) a mixture of two or more fluoroalkyl group-containing organopolysiloxanes having a fluoroalkyl group and at least two alkenyl groups per molecule, wherein the contents of the fluoroalkyl groups differ from each other, and wherein the two or more fluoroalkyl group-containing organopolysiloxanes are a combination of those which are not completely compatibilized at 25° C. when mixed in the absence of a solvent;
(B) an organopolysiloxane having at least three silicon-bonded hydrogen atoms per molecule;
(C) an effective amount of a hydrosilylation reaction catalyst; and
(D) an organic solvent capable of compatibilizing the entire composition by uniformly compatibilizing the mixture of two or more fluoroalkyl group-containing organopolysiloxanes serving as component (A);
wherein component (A) is a mixture of:
(A1) one or more linear or branched organopolysiloxanes comprising fluoroalkyl group-containing organodisiloxane units, wherein the fluoroalkyl group is a 3,3,4,4,5,5,6,6,6-nonafluorohexyl group, and wherein the units are 39 mole % or more of the total organosiloxane units; and
(A2) one or more linear or branched organopolysiloxanes comprising fluoroalkyl group-containing organodisiloxane units, wherein the fluoroalkyl group is a 3,3,4,4,5,5,6,6,6-nonafluorohexyl group, and wherein the units are 36 mole % or less of the total organosiloxane units.

* * * * *